United States Patent [19]

Ikuo et al.

[11] 4,441,289
[45] Apr. 10, 1984

[54] EARTHQUAKE-RESISTANT REINFORCEMENT STRUCTURE FOR AN EXISTING BUILDING WITH COMPRESSION BRACES OR TENSION BRACES

[75] Inventors: Yamaguchi Ikuo; Higashibata Yasuo; Fujimura Masaru, all of Tokyo, Japan

[73] Assignee: Takenaka Komuten Co., Ltd., Osaka, Japan

[21] Appl. No.: 147,365

[22] Filed: May 7, 1980

[51] Int. Cl.³ .............................................. E04H 9/02
[52] U.S. Cl. ..................................... 52/167; 52/240; 52/252; 52/657; 52/695; 52/741
[58] Field of Search ............... 52/1, 167, 439, 438, 52/231, 240, 655, 657, 695, 747, 252, 259, 293, 583, 741; 403/232.1, 174

[56] References Cited

U.S. PATENT DOCUMENTS

| | | | |
|---|---|---|---|
| 1,536,717 | 5/1925 | Krekel | 52/657 |
| 2,058,364 | 10/1936 | Sorensen | 52/231 |
| 2,194,810 | 3/1940 | Reiner | 52/695 |
| 3,380,209 | 4/1968 | Cheskin | 52/231 X |
| 4,267,682 | 5/1981 | Fowler et al. | 403/174 |

FOREIGN PATENT DOCUMENTS

| | | | |
|---|---|---|---|
| 17902 | 1/1929 | Australia | 403/232.1 |
| 2241897 | 3/1974 | Fed. Rep. of Germany | 52/293 |
| 948108 | 1/1949 | France | 52/240 |
| 52-12742 | 1/1977 | Japan | 52/167 |
| 393423 | 12/1973 | U.S.S.R. | 52/167 |
| 600268 | 3/1978 | U.S.S.R. | 52/167 |

Primary Examiner—Alfred C. Perham
Attorney, Agent, or Firm—Eric P. Schellin

[57] ABSTRACT

A method for providing earthquake reinforcement for existing buildings by applying pre-compressive or pre-tensile stresses. In a first embodiment, a compression brace is provided on the beam pillar structure of the building in a diagonal direction to the structure so as to apply a pre-compressive stress to the compression brace. In another embodiment, a tension brace is provided on the beam pillar structure of the building so as to apply a pre-tensile stress to the tension brace in order to reinforce the building against an earthquake.

4 Claims, 7 Drawing Figures

EARTHQUAKE-RESISTANT REINFORCEMENT STRUCTURE FOR AN EXISTING BUILDING WITH COMPRESSION BRACES OR TENSION BRACES

SUMMARY OF THE INVENTION

This invention relates to an earthquake-resistant reinforcement structure for an existing building, and more particularly, to a structure for increasing antiseismicity in a answer to a demand for greater aseismicity of buildings.

The method according to this invention comprises providing a compression brace on a beam-pillar structure of a building in a diagonal direction thereto so as to apply a pre-compressive stress to the compression brace or providing a tension brace on a beam-pillar structure of an existing reinforced concrete building so as to apply a pre-tensile stress to the tension brace in order to reinforce a building against earthquake-resistance.

DETAILED DESCRIPTION OF THE INVENTION

The invention aims at providing an earthquake-resistent reinforcement method which is economical as well as readily applicable and, further, effective as a means or a counter-measure applicable when an existing reinforced concrete building still in use is found insufficient in aseismicity and safety in practical use. An object of this invention is to avoid the inconvenience which might be caused when the building is pulled down and rebuilt again for reinforcement.

Another object of this invention is to provide an earthquake-resistant reinforcement structure for an existing building by means of a compression brace utilizing a pre-compressive stress. The reason to use a compression brace for reinforcement is because it can be readily used and is very effective in increasing aseismicity.

Still another object of this invention is to provide an earthquake-resistant reinforcement method for a building making use of a tension brace. Tension brace is preferable because it is effective in reinforcement as well as readily applicable in practice.

The aforementioned and other objects and characteristics of this invention will be more thoroughly understood from the description and the drawings below.

Figure 1:
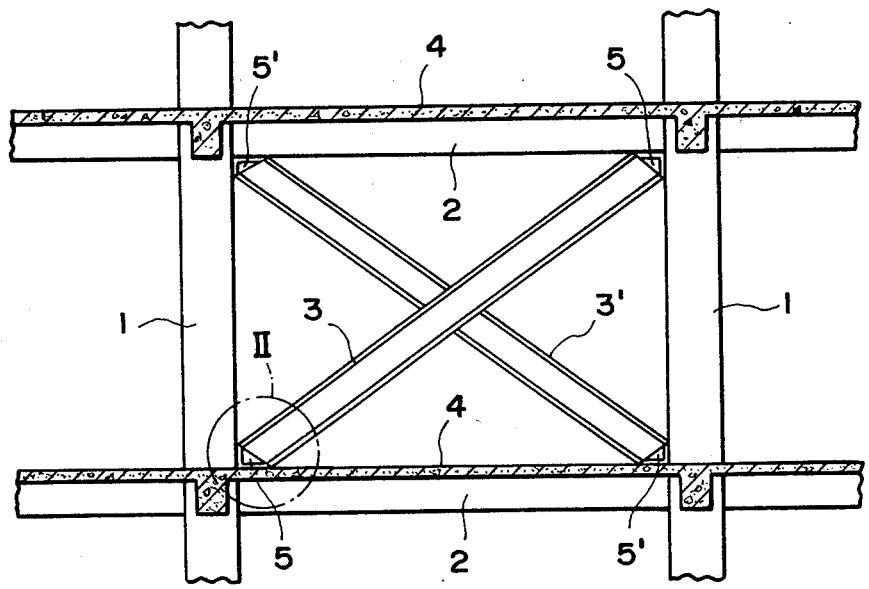
FIG. 1 is a vertical cross sectional view of an existing building in which the earthquake-resistant reinforcement method is embodied.
Figure 2:
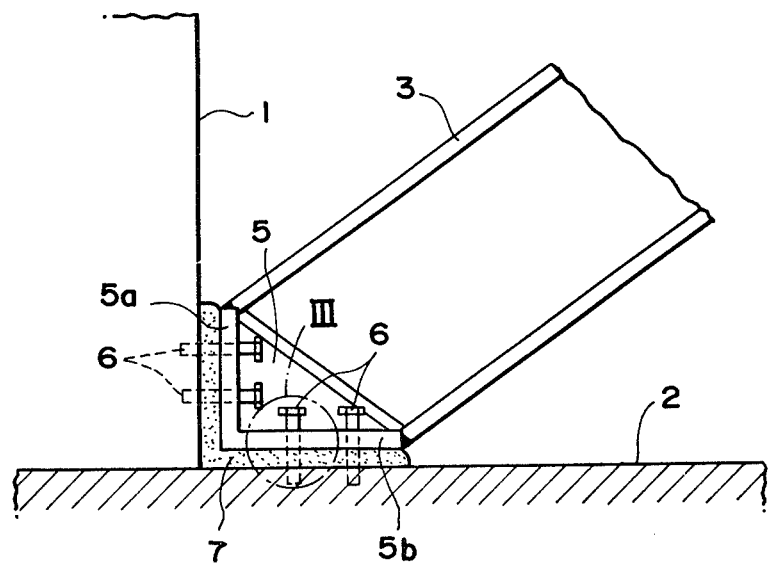
FIG. 2 is a detailed view which shows the part indicated by II in FIG. 1 in enlargement.
Figure 3:
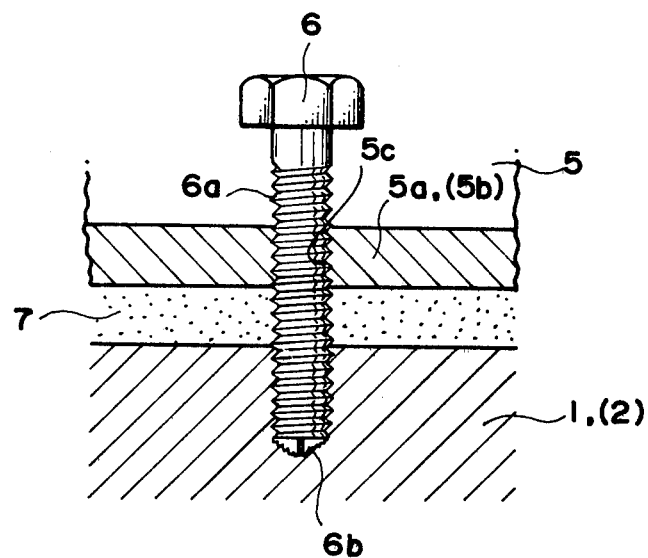
FIG. 3 is a detailed view showing the part indicated by III in FIG. 2 in enlargement.
Figure 4:
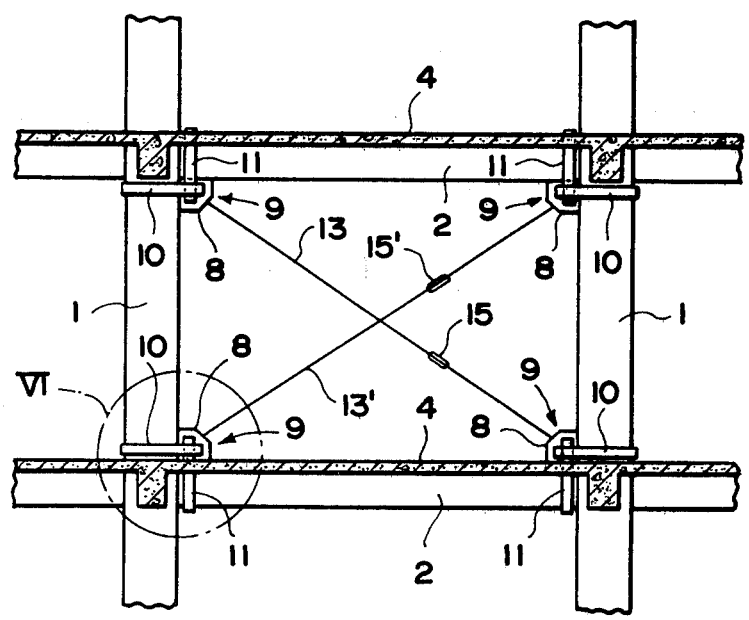
FIG. 4 is a vertical cross sectional view of an existing building in which the earthquake-resistant reinforcement method is embodied.

FIGS. 1 to 3 show an embodiment of this invention of the earthquake-resistent reinforcement method for an existing building wherein the reference numerals 1 and 2 denote pillars and beams of reinforced concrete system, 3 a compression brace and 4 a slab of reinforced concrete system installed for each floor. The compression brace 3,3' are made of steel structure such as an H beam, precast concrete or other compression-resistant structure and provided with connectors 5 and 5' in a form of a right triangle when viewed fron front at both ends as shown in FIG. 2. The compression braces 3 and 3' are arranged intersectingly to each other and in a diagonal direction to the beam-pillar frame structures 1 and 2 made of reinforced concrete by aligning connectors 5 and 5 or right-angled triangle in shape with the right-angled corners of the said beam-pillar structure in a symmetrical manner.

In the figure, the reference number 6 denotes a tap bolt having a sufficient length and further having a cutting lip 6b capable of cutting concrete respectively and being screwed to tapped through-holes 5c . . . provided in a desirable number with a predetermined interval in a vertical member 5a and a horizontal member 5b which correspond to the two sides forming the right angle of the triangle connectors 5. As described in the foregoing, after the compression braces 3 and 3' are arranged diagonally to the beam-pillar structure, the said compression braces 3 and 3' are fixed by screwing the tap bolt 6 onto the connectors at both ends while concurrently applying a pre-compressive stress. While the tap bolt is screwed into the connector, the cutting lip thereof 6b comes to strike against the surface of either the concrete pillar or the concrete beam and if the tap bolt is kept on screwed with a stronger torque, the connectors start receding backward instead of the tap bolt pushing into the concrete, thereby causing the compression braces 3 and 3' producing a compressive stress. However, when the compressive stress induced on the compression braces reaches a certain point, the tap bolt 6 which is receiving the compressive stress as a reaction resumes proceeding by cutting the concrete with the lip 6b finally to be supported securely in the concrete a shown in FIG. 3. As a result, each compression brace of 3 and 3' is fixedly supported in a manner wherein it would not be moved or disconnected by an external force at the time of earthquakes and substantially integrated with the framed structure of beams and pillars. Simultaneously, the compression braces are provided with a pre-compressive stress as a reaction against the resistance from the concrete when the lip 6b is cutting therethrough up to a certain limit. Therefore, the compression braces 3 and 3' can effectively resist integrally with the framed structure of the beams and the pillars against the force caused by earthquakes which is affecting on the said structure, thereby increasing aseismicity thereof. Accordingly if the aforementioned pre-compressive stress is provided to all or necessary framed structures of a building by arranging compression brace thereto, the earthquake-resistent strength of the building can be increased and the safety sufficiently reliable in practical application can be obtained. Unless the compression braces are insecure and easily disconnected, an ordinary bolt without a cutting lip 6b may be similarly used as the tap bolt. In a case when the tapped hole 5c of the connector is not sufficiently strong, it may be reinforced by increasing the thickness of the tapped hole portion 5c of by welding a nut which is prepared separately thereto. In the figure, the reference numeral 7 denotes mortar which is filled compactly within the clearance between the surface of the pillar 1 or the beam 2 of reinforced concrete system and the connector 5. The compression braces 3 and 3' become more solidly supported as the mortar hardens.

FIGS. 4 to 7 show another embodiment of the earthquake resistant reinforcement method for an existing building according to this invention utilizing a tensile brace.

In the figure the reference numerals 13 and 13' denote tensile braces made of a wire rope, a steel rod or other similar tension materials. Each tensile brace is provided with joints 15 and 15' which are adjustable in length and coupling members 9,9 at the both ends thereof. The tensile braces 13 13' are arranged intersectingly to each other and diagonally to the beam-pillar frame structure of reinforced concrete system 1,1 and 2,2. The tensile braces are connected to the beam-pillar frame structure at the corners thereof by the said coupling members 9,9 and are made to apply a pre-tensile stress by adjusting the joints 15 and 15'.

Figure 5:
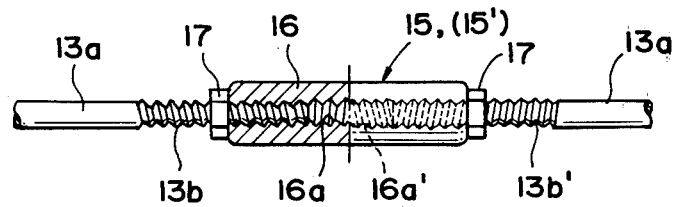
FIG. 5 is a frontal and partially cross sectional view of a joint for the tension brace.

One embodiment of the joint 15 or 15' is shown in FIG. 5 wherein the joint is of a turnbuckle type which is adjustable in length. Making use of such joints, two tensile brace materials 13a and 13a' are coupled together to form a tensile brace 13 or 13' in a manner described below. Fist, two lock nuts 17 and 17' are screwed over male screws which are formed at both opposing ends of the two tensile brace materials 13a and 13a' and which are provided with helical threads in opposing directions to each other. The male screws, then, are mated with a female screw sleeve 16 having a desirable length and provided with reverse screws 16a and 16a'. The female screw sleeve 16 is divided internally into two portions at the center thereof so as to have helical threads in opposing directions on the reverse screws 16a and 16a' in the respective portion to mate with the corresponding male screws of the tensile brace materials 13a and 13a'. Therefore, by selecting suitable revolving direction and revolution number, the length of the tensile brace 13 or 13' can be adjusted and the adjusted length can be fixed with the lock nuts 17 and 17'.

Figure 7:
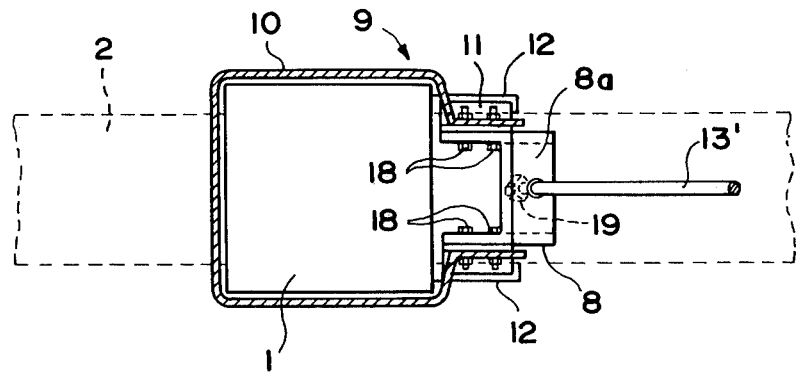
FIG. 7 is a plane view of FIG. 6.
Figure 6:
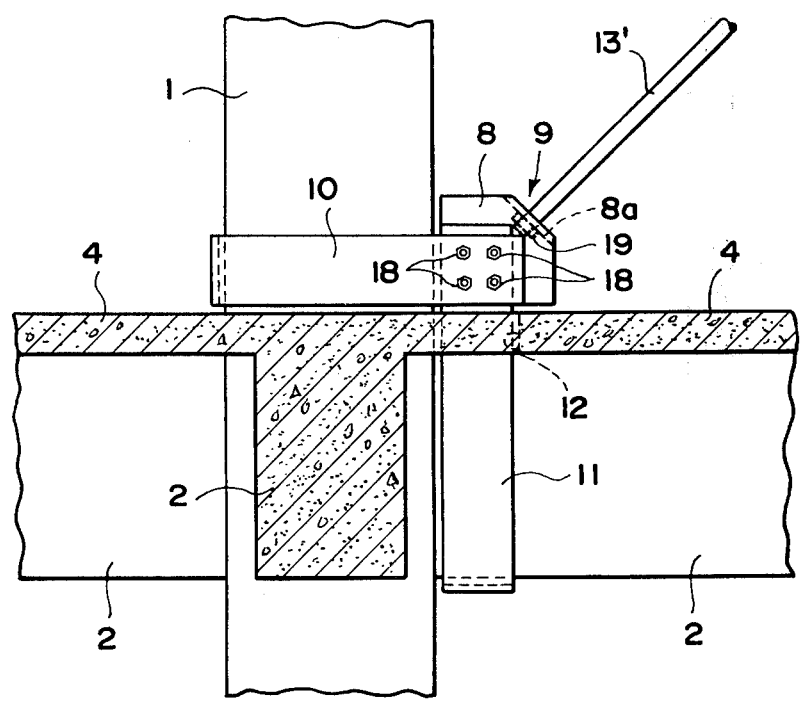
FIG. 6 is a detailed view showing in enlargement of the part indicated by VI in FIG. 4.

The coupling member 9 comprises, as an embodiment thereof is shown in FIGS. 6 and 7, a gusset 8 of steel material shaped as a letter U or when viewed from front (or as shown in FIG. 6) shaped as almost a square and having a sloped member 8a vertical to a diagonal line of the beam-pillar structure. The coupling is effected in the process which is comprised of passing an end portion of the tensile brace 13' (the same is applicable to 13) through the said sloped member 8a and securing the end portion with a nut 19 screwed to the reverse side of the sloped member 8a, arranging two bands 10 and 11, which have a desirable tensile strength and flexibility, for instance of steel band plate, so as to place the two bands perpendicular to each other, superposing both ends thereof on both side faces of the gusset 8 to abut thereon and integrally coupling them with a plural number of bolts 8 . . . and nuts.

The tensile braces 13 and 13' are arranged in a beam-pillar framed structure of an existing building in the following manner. First, a horizontal band 10 is wound around a pillar 1 while a vertical band 11 is wound around the beam 2 through an opening 12 perforated in the slab 4 therefor. Then, both end portions of the bands are superposed to abut on the both sides of the gusset 8 to connect the tensile braces 13 and 13' by means of bolts 18 and nuts, tensile braces 13 and 13' can readily be arranged diagonally to the beam-piller framed structure. In such arrangement, desirable pre-tensile stress is easily obtained by operating the joints 15 and 15' to give tension on the tensile braces 13 and 13'. Accordingly, in this invention, the beam-pillar framed structure can be substantially integrated with the respective tensile brace 13 and 13' so as to effectively resist against the force produced at earthquakes as one unit with an increased aseismicity. Therefore, if tensile braces are installed on all or necessary beam-piller framed structures of an existing building in the above described manner to apply a pre-tensile stress, the earthquake-resistant strength of the building is reinforced so as to offer safety sufficiently reliable in practical application.

What is claimed for:

1. An earthquake-resistant reinforcement method for an existing building comprising the steps of:
   (a) arranging compression braces in a diagonal direction to a beam-pillar frame structure of the building;
   (b) providing connectors of right triangle shape at the ends of said compression braces;
   (c) screwing tap bolts provided with a cutting lip at the tip into the portions corresponding to the two perpendicular sides of the right triangle until the bolts are securely supported within the beam, or the pillar of the frame structure whereby a precompression stress is applied on the compression braces.

2. An earthquake-resistant reinforcement method for an existing building comprising the steps of:
   (a) arranging tensile braces in a diagonal direction relative to a beam-pillar frame structure of the building;
   (b) providing joints which are adjustable in length on the tensile braces; ;p1 (c) providing gussets at each end of the tensile braces;
   (d) connecting the gussets to the beam-pillar frame structure of the building by means of two bands wound respectively around a pillar and a beam; and
   (e) applying pretensile stress to the tensile braces by adjusting the length of the adjustable joints.

3. An earthquake-resistant reinforcement structure for a building comprising:
   (a) compression braces;
   (b) connectors of right triangle shape connected to each end of the compression braces; and
   (c) tap bolts having a cutting lip at the end thereof for screwing through the two perpendicular sides of the right triangle shaped connectors into pillars and beams of the building to connect the compression braces diagonally relative to a pillar-beam frame element of the building whereby a precompression stress is applied on the compression braces.

4. An earthquake-resistant reinforcement structure for a building comprising:
   (a) tensile braces comprising joints which are adjustable in length to provide a pretensile stress on the braces;
   (b) gussets which are coupled to each end of the tensile braces; and
   (c) two bands wound respectively to a beam and pillar of the building to which the gussets are connected so that the tensile braces are connected diagonally relative to a beam-piller frame element of the building.

* * * * *